FIG. I.

INVENTORS
FRANCIS D. GREENLEAF
EUGENE B. NOVIKOFF
BY ALAN T. WALTHER

Mitchell & Bechert
ATTORNEYS

May 17, 1955

F. D. GREENLEAF ET AL 2,708,615

HIGH-SPEED RECORDER

Filed March 1, 1952

INVENTORS
FRANCIS D. GREENLEAF
EUGENE B. NOVIKOFF
BY ALAN T. WALTHER

Mitchell & Bechert

ATTORNEYS

United States Patent Office 2,708,615
Patented May 17, 1955

2,708,615
HIGH-SPEED RECORDER

Francis D. Greenleaf, Syosset, Eugene B. Novikoff, Floral Park, and Alan T. Walther, Mineola, N. Y., assignors to Servo Corporation of America, New Hyde Park, N. Y., a corporation of New York Application March 1, 1952, Serial No. 274,442

27 Claims. (Cl. 346—33)

Our invention relates to recording or the like means and, in particular, to an improved means for electrically producing visible records on suitably electrically sensitive recording paper or the like. This invention is in the nature of an improvement over the invention of Frank G. Willey, as disclosed in patent application Serial No. 158,465, filed April 27, 1950.

It is an object of the invention to provide an improved device of the character indicated.

It is another object to provide improved recorder means wherein there will be no mechanically moving parts except those necessary to advance the recording means and the recording paper or the like relatively to each other.

It is another object to provide improved recorder means having none of the limitations of frequency response common to present-day stylus-type recorders, and which may nevertheless produce an immediately available visible record.

It is a further object to provide a recorder meeting the above objects and yet requiring no dark chamber or developing fluids for producing a permanent visible record.

Another object is to provide improved recorder means having a single recorder head capable of recording a plurality of independent functions simultaneously.

It is also an object to provide improved means for multiplexing a plurality of independent functions for recording in a device of the character indicated, and simultaneously recording any and all such functions over the full chart width, if so desired.

Still another object is to provide improved recording means having theoretically no upper limit to the number of independent functions which said recording means can handle simultaneously.

It is a specific object to provide recording means that may continuously, smoothly, and without lag or inertia effects, permanently record one or more input-signal variations up to and exceeding 100 cycles per second with an immediately visible record, regardless of the number of independent input-signal variations being recorded.

It is another specific object to provide means for increasing the marking duty cycle in recording means of the character indicated.

A further specific object is to provide relatively simple contrast control for the record produced by a device of the character indicated.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Figure 1:
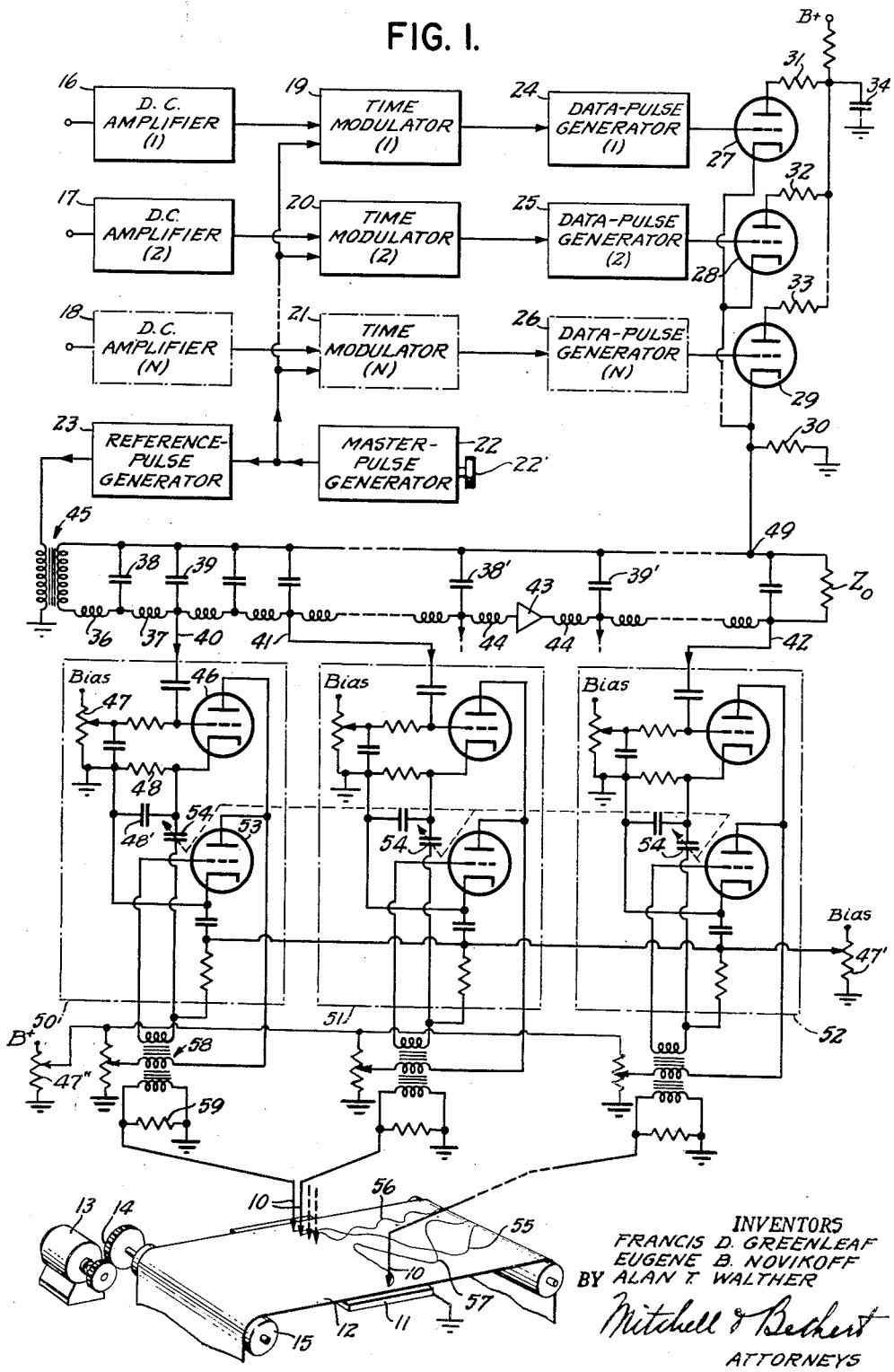
Fig. 1 is an electrical diagram, schematically illustrating a recorder incorporating features of the invention.

Briefly stated, our invention contemplates an electronic recorder involving no mechanical moving parts except those which may be employed to advance the recording paper or the like relatively to the recording head in order to develop one or more recorded functions of time. The invention utilizes the property of progressive electrical-delay means, such as a delay line having a physical length, to transform an electrical signal that is a function of time into an electrical signal that is a function of distance along the delay means. Various means may be employed for sensing the signal as a function of distance (along the delay means) at any instant of time, and in a regularly scanning system the sensing means may be recycled with a periodicity corresponding to travel time along the delay means.

The recording head may include two cooperating recording members, each having mutually facing discharge or electrode portions spaced sufficiently to accommodate suitable electrically responsive recording paper or the like. The discharge or electrode portions may both extend transversely of the general motion of the recording paper or the like, and may be fixed relatively to each other. One of the recording members may include electric delay-line means progressively delaying (along the length thereof) the propagation of an electrical signal applied at one end thereof. This one recording member may further include, at the discharge or electrode portion thereof, means for progressively applying along the longitudinal extent of said discharge portion a charge-potential representative of the signal as it progresses along the delay-line means. Thus, at any given instant of time following application of such signal to the delay-line means, a charge potential representative of a characteristic part such as the wave front of the signal may first appear at a particular location along the discharge or electrode portion. If the input variable is caused to modulate a time-modulator, thus producing a reference characteristic and a function characteristic identifying the input variable, then the placement of one of these characteristics on the delay-line means for progressive delay for travel in one direction, and the placement of the other characteristic across all marking points simultaneously (or for travel along the delay-line means in the opposite direction), will result in a localized (marking) signal of substantially double amplitude; the placement of such localized signal across the recording paper or the like reflects the instantaneous magnitude of the input variable.

In the forms to be described, the device will accept one or more independent variables to be recorded simultaneously as a function of time. These variables are translated into time-modulated intelligence, in each case identified with what may be termed a function or data characteristic and a reference characteristic. The various function or data characteristics identifying the several input variables may all be related to the same reference characteristic.

In one form to be described, the reference characteristic is applied to the delay-line means, while the function characteristic (which may include a multiplexed succession of function pulses for each reference pulse) is utilized to activate the full length of the recording head. For each such activation, the recording head will place a mark in a particular transverse position on the recording paper or the like, corresponding to the instantaneous placement of the reference characteristic along the delay line; thus, for the case of two input variables involving two function or data pulses, appropriately time-spaced with respect to the same reference pulse (for each cycle of operation), there will be two activations of the recording head. At the first such activation, a first mark will be placed on the paper corresponding to the instantaneous placement of the reference characteristic along the delay-line means, and the second mark will later be placed on the paper upon the second activation at a location corresponding to the then-instantaneous placement of the reference characteristic along the delay-line means. The operation will recycle with every time-modulating cycle and, of course, the time-spacing of the function or data pulses will vary with respect to the reference pulse for each cycle in accordance with variations in the input variables.

In the other general forms to be described, the entire succession of all function or data pulses is placed on the delay line with each recycling of the time-modulator, and the recording head is activated once for each recycling interval. With each such activation, the recording head will produce a properly spaced series of marks transverse to the movement of the paper to reflect the time-spacing of the function or data pulses which, in turn, may reflect the instantaneous magnitudes of the input variables.

Regardless of which of the above general forms is employed, the actual marking is effected in response to the time-coincidence of function (or data) and reference pulses, wherever such coincidences may occur along the delay line, or across the recording head. However, in accordance with a feature of the invention, we provide means utilizing an additional source of power for improving the marking duty cycle, as, for example, amplifier means triggered in each case in response to the time-coincidences which would otherwise have produced marks. By this means, not only may more energy be applied to each marking discharge but the length of time utilized for making each mark may be extended beyond the mere time-overlap of function and reference pulses, as seen at any particular point along the recording head.

Referring to Fig. 1 of the drawings, our invention is shown in application to a recording device including recording-head means comprising a plurality of spaced marking electrodes 10 for discharge to a common electrode 11 through a continuously moving piece of electrically sensitive recording paper or the like 12. We have shown the recording paper to be in strip form and to be continuously driven by a motor 13, suitably geared at 14 to an advancing roll 15.

In accordance with the invention, the recording head 10—11 may be caused (actually or virtually simultaneously) to record on the paper 12 any given number of independent variables. We have schematically indicated that these variables become available to the system through a corresponding plurality of D. C. amplifiers 16—17—18 which, for convenience, we have indicated to handle signals 1, 2, . . . N (see legends in parentheses). A single time-modulator may accept input signals from amplifiers 16—17—18 for conversion to a single time-modulated signal, characterized by separate function or data pulses appropriately related in time to a common reference pulse; however, in the form shown, we have employed separate time-modulators 19—20—21, independently generating the desired function or data pulses. Time-modulators 19—20—21 may be synchronized or recycled by a common master-pulse generator 22, which may also provide timing impulses for operation of a reference-pulse generator 23. In order to provide reference or data pulses of sufficient strength for further handling in the recorder, we show separate data-pulse generators 24—25—26 responsive to the respective time-modulated outputs of modulators 19—20—21.

Various means may be employed for isolating the function-pulse-generator outputs from each other when applied to the recording head and, in the form shown, we have shown multiplexing means involving a separate space-discharge device 27—28—29 for each of the input channels. Multiplexing is achieved by connecting the discharge devices 27—28—29 to a common load as at 30, and in the form shown this load appears in the cathode circuits. All tubes 27—28—29 are shown connected through resistors 31—32—33 to a common B-supply, with means 34 to eliminate transient intercoupling between tubes.

As indicated generally above, delay-line means are utilized for determining the transverse location at which a particular marking electrode 10 will be activated. In the form shown, the delay line is schematically depicted as a regular succession of series inductances 36—37 and shunt capacitances 38—39. The delay-line is tapped at every other section, as at 40—41—42, and is terminated at the remote end by its characteristic impedance $Z_0$. If desired, amplifier means 43 may be introduced at one or more locations down the delay-line means, as by insertion between adjacent series inductances 44 and shunt capacitances 38'—39'; in this manner, adequate pulse strength may be assured, whatever the length of the delay line.

Although we refer herein to the use of delay-line means in activating particular electrode circuits in accordance with the magnitude the sampled input functions, it will be understood that, functionally speaking, the delay-line means may be viewed as a high-speed switch or commutator, characterized by a given delay between successive switching points. We have shown entirely passive delay-line means; but it will be clear that an active sequential switch, such as the chain multivibrator described in co-pending application Serial No. 260,992, filed December 11, 1951, may also be used.

Signals may be placed upon the line by transformer-coupling means 45, and in the form shown we apply reference pulses (appearing in the output of generator 23) directly to the delay line, at the primary of transformer 45. For each recycling of the time-modulator means 19—20—21, a new reference-pulse will be applied to the line at 45, and the recycling period is preferably chosen so that each reference-pulse may be allowed to travel the full length of the line, for absorption at the characteristic impedance $Z_0$, prior to recycling. The actual length of the reference pulse is preferably substantially that length of time represented by the delay between adjacent outlet taps 40—41 along the line. Thus, at any instant of time within the cycling period, the reference pulse will appear on the line at a particular one of the outlet taps 40—41 . . . 42, depending upon the elapsed time following application to the line.

As explained generally above, we may employ means for activating the recording head 10—11 at relatively high energy levels upon each time-coincidence of a function or data pulse with the reference pulse, depending upon where the reference pulse happens to be along the delay-line means. In the form of Fig. 1, we employ for each marking electrode 10 amplifier means in the form of a separate blocking oscillator 50—51—52. The multiplexed successions of reference or data pulses available at the common cathode load 30 may be applied, as at 49, to the common side of the delay-line means, and the adjustment of the amplifier means or blocking oscillators 50—51—52 is preferably such that no blocking oscillator will be triggered into operation unless there is coincidence of function and reference pulses for such amplifier means.

The blocking oscillators 50—51—52 are in separate circuits connecting individual delay-line taps to their respective styli or marking electrodes 10. These oscillators provide a means not only for increasing the instantaneously available marking energy, but also for increasing the pulse length beyond that of the individual pulses travelling the delay line; the blocking oscillators thus provide an increase in the marking duty cycle. The oscillators shown each include a trigger tube 46 and an oscillator tube 53, connected for what may be termed series-parallel triggering. Tubes 46—53 may be normally biased below cut-off by grid-bias potentiometers 47—47', respectively. The bias at 47 will be understood to keep tube 46 cut off even when a function or reference pulse appears alone at tap 40; but in the event that the function and reference pulses are coincident at tap 40, then the bias at 47 is small enough to permit conduction and, therefore, triggering by tube 46. The parallel-triggering connection is achieved by connecting the plates of both tubes 46—53 in common to transformer 58, and the series-triggering connection results from application of the cathode-follower output (across resistor 48) of tube 46 through a coupling capacitor 54 to the grid of tube 53.

In order further to increase the marking duty cycle, we provide pulse-stretching means in the trigger circuit, at capacitor 48'. Upon firing the trigger, capacitor 48' is charged and tends to retain the charge, and thus to stretch the trigger pulse in accordance with the relation between capacitor 48' and resistance 48.

In operation, the oscilaltor tube 53 is fired under the combined influence of reduced plate votlage (upon firing trigger tube 46) and of increased grid signal (from the cathode follower). For each marking discharge, the length of time for conduction of tube 53 is governed to a large extent by the setting of coupling capacitor 54, and, if desired, the capacitors 54 may be ganged, as suggested by the dotted-line interconnections. However, we prefer to control marking energy (i. e. contrast control) by varying the bias at 47' or the B-supply at 47".

For the described arrangement, it will be appreciated that the multiplexed function or data pulses will effectively scan the entire delay line N-times for each cycling period of the master-pulse generator 22. Each of the N scans will be placed in proper relation to the remaining scans in accordance with the instantaneous magnitude relations of the input variables; for each such scan, there is but one chance of a coincidence with the reference pulse along the delay line. For example, for one scan reflecting the instantaneous magnitude of the input variable applied at amplifier 16, the pulse coincidence may occur at the delay-line tap 40, so that oscillator 50 is triggered to produce a marking discharge at the outermost marking electrode 10, which may at that instant of time be responsible for marking an element of the effectively continuous trace 55 on the recording paper. The next scan may reflect the instantaneous magnitude of the second input variable, as applied to the amplifier 17, and the time coincidence of reference and data pulses may occur at the delay-line tap 41, thus activating amplifier means 51 to the exclusion of all other amplifier means and giving rise to a mark representing an element of another recorded function, such as 56 on the recording paper. Lastly, for each cycling period, the Nth data pulse will produce a coincidence (with the further-dalayed function pulse) reflecting the instantaneous magnitude of the Nth input variable; this coincidence may activate amplifier 18, the last amplifier means 52 for the scanning cycle under consideration, to give rise to a new recorded element of the curve 57 on the recording chart. Although the elements of traces 55—56—57 for the described marking cycle happen to have been made in the sequential order of input amplifiers 16—17—18, there is nothing in the described circuit which makes this necessarily the case; in other words, the recorded trace for any one or for all the input variables may occupy the full chart width, so that the recorded traces may cross from time to time, as suggested by the recorded traces shown on chart 12 in Fig. 1.

Figure 2:
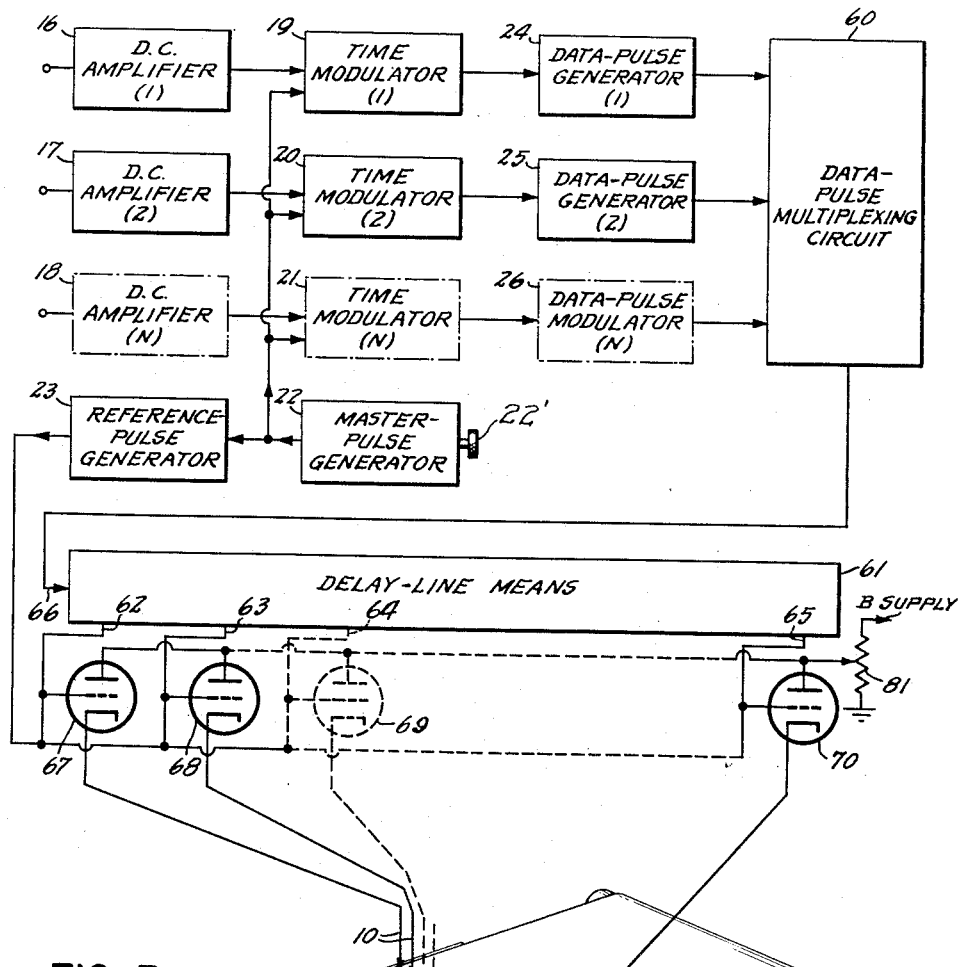
Fig. 2 is a similar diagram, schematically illustrating an alternative construction.

In Fig. 2, we show an alternative construction for simultaneously recording N input variables on the same moving strip 12 of recording paper or the like. The input processing circuits to the data-pulse multiplexing circuit 60 may be the same as those described in Fig. 1 and, therefore, they are identified with the same reference numbers. The delay-line means is schematically indicated by a block 61, having a plurality of progressively delayed tap outlets 62—63—64 . . . 65. As distinguished from the arrangement of Fig. 1, however, the multiplexed function or data pulses are applied to the delay-line means, as at 66, and as by means analogous to those described at 45 in Fig. 1. As also in the case of the Fig. 1 arrangement, the entire recording head 10—11 may be simultaneously activated by supplying activation signals to a plurality of amplifiers 67—68—69—70, there being one such amplifier for each marking electrode 10; in Fig. 2, however, such activation occurs once per time-modulation cycle and is timed by the reference-pulse characteristics. The amplifier means 67 to 70 may be gas-discharge devices of the so-called thyratron type, and we have applied the output of the reference-pulse generator 23 directly and in common to all control electrodes of the thyratrons.

In operation, it will be seen that the multiplexed function or data pulses will be distributed along the length of the delay-line means 61 in accordance with the instantaneous relative amplitudes of the input variables, and that the reference pulses effectively sample the entire delay line once for each cycling of the master-pulse generator 22. Recorded traces (not shown) may all occupy the full width of chart 12, and they may cross one another in the manner described in Fig. 1.

Figure 3:
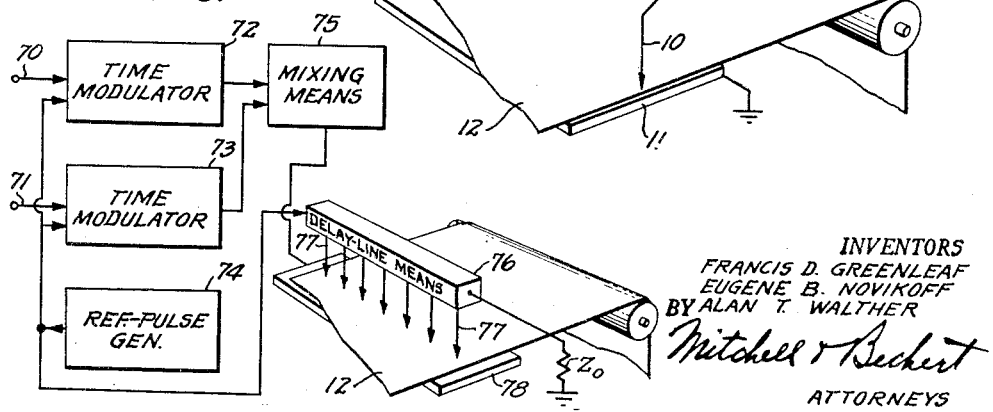
Fig. 3 is a simplified diagram, schematically illustrating a further alternative.

In Fig. 3, we illustrate a simplified version of our multiplexed method of marking on recording paper 12, in an organization resembling one of those described in the above-identified copending patent application of Frank G. Willey. In accordance with such system, a plurality of input variables are available at lines 70—71 in controlling relation with separate time-modulators 72—73, as synchronized by a reference-pulse generator 74. Mixing means 75 accept the outputs of the time-modulators for multiplexing the plurality of function or data pulses; although not specially identified by the legend, it will be understood that mixing means 75 may include amplifier means to provide, in combination with a delayed pulse, a signal of marking strength across the paper 12 at one of electrodes 77. In the form shown, the recording-head comprises delay-line means 76, terminated by its characteristic impedance $Z_0$ and tapped at multiple locations directly to marking electrodes 77. Marking discharges are produced by applying to a base platen 78 beneath the recording paper one of the signals from circuits 74—75, and by applying the other of said signals to the delay-line means. In the form shown, the multiplexed function or data pulses are applied to the platen 78, and the reference pulses are applied to the delay-line means, in a manner functionally analogous to that described in Fig. 1.

It will be appreciated that we have described ingenious means for the simultaneous recording of a plurality of input variables on the same chart. Our recording means need involve no mechanical moving parts other than the mechanism required to advance the paper past the recording head. The system is free of inertia and is not in any way frustrated by signals which cause crossovers of traces on a single sheet of recording paper. Quite aside from the number of channels multiplexed into our system, we have disclosed improved means for creating the marking discharges with a marking duty factor exceeding anything realizable from the energy available in two coincident pulses alone. Considering the superior results obtainable with our device, the mechanism is relatively simple, and even the design of the delay-line means need not require critical attention to suit the requirements of individual recording conditions. Either of the basic forms of the invention lends itself readily to simple manual control of recorded contrast; in the case of Fig. 1, the settings of either or both potentiometers 47'—47" may selectably determine the marking energy available from all blocking-oscillator tubes 53, and in the case of Fig. 2 a further potentiometer 81 may provide variation of the common B-supply so as to control the energy of discharges produced by thyratrons 67—70. Further control of marking density may be achieved by variation of the master sampling rate, as suggested by the manual control 22' shown on master-pulse generator 22.

As a further feature of the arrangement of Fig. 1, it will be observed that the repetition rate of the master-pulse generator 22 may be so related to the recovery characteristic of the blocking oscillators as to produce an automatic regulation of marking energy at any particular stylus location, thereby avoiding or substantially reducing "burn" spots due to localized "overloading" of the recording chart 12. Generally speaking, for each trigger excitation, the output of any one of the blocking oscillators will be characterized by a relatively short poled surge or pulse, for which a relatively short time constant is applicable; this is followed by a relatively prolonged recovery of substantially lesser magnitude, the recovery duration being largely determined by the ability of capacitor 54 to retain its charge. Until this recovery period has progressed to a given "excitation threshold" (as determined by the magnitude of trigger pulses appearing across resistor 48), the blocking oscillator will fail to respond to a succeeding trigger pulse. Therefore, if two or more succeeding trigger pulses are fed to the same blocking oscillator, and if the pulse-repetition rate has a period less than the time of recovery to the "excitation threshold," the blocking oscillator will ignore the second such trigger pulse; likewise, if the recovery time constants are even greater as compared with the pulse-repetition period, the blocking oscillator may ignore two or three succeeding pulses so as to produce a marking discharge only for every third or fourth such pulse. It will thus be seen that we have provided a means for automatically reducing the marking duty cycle whenever necessary to avoid saturation or burning effects on the chart. Once adjusted, this automatic accommodation of the chart will hold true, without special adjustment of the individual blocking-oscillator time constants, whatever the selected basic pulse rate, as determined by the manual setting at 22'.

Although we have described the various time modulations as being fed from D.-C. amplifiers, it will be appreciated that this feature applies particularly to a general purpose instrument, accepting a wide range of input signals, including fluctuating and relatively non-fluctuating signals. If the instrument is to be used in special circumstances not having the requirement for accepting the relatively non-fluctuating signals, it may be preferred to employ A.-C. amplifiers to feed the time modulators.

While we have described our invention in detail for the preferred forms shown, it will be understood that modifications may be made within the scope of the invention, as defined in the claims which follow.

We claim:

1. In a device of the character indicated, recording-head means including oppositely spaced elongated electrode means to accommodate a moving piece of electrically responsive recording paper or the like in the space between said electrode means, one of said electrode means including a plurality of closely spaced generally aligned electrode portions, multi-tap delay-line means, pulse-generator means including reference-pulse and time-modulator means responsive to an input variable for producing reference and function pulses time-spaced in accordance with the instantaneous magnitude of said variable, means connecting one end of said delay-line means for response to one of said pulses, marking-control means connected to said electrode portions and to a plurality of the taps of said delay-line means and including power-supply means, and a control connection to said marking-control means for response to the other of said pulses.

2. A device according to claim 1, in which said means connecting one end of said delay-line means is responsive to said function pulses.

3. A device according to claim 2, in which said last-defined control connection is responsive to said reference pulses.

4. A device according to claim 1, in which said means connecting one end of said delay-line means is responsive to said reference pulses.

5. A device according to claim 4, in which said last-defined control connection is responsive to said function pulses.

6. In a device of the character indicated, recording-head means including oppositely spaced elongated electrode means to accommodate a moving piece of electrically responsive recording paper or the like in the space between said electrode means, one of said electrode means including a plurality of spaced independent marker electrodes, independent signal-amplifiers for each of said marker electrodes, pulse-generator means including time-modulator and reference-pulse means responsive to an input variable for producing reference and function pulses time-spaced in accordance with the instantaneous magnitude of said variable, means for the automatic selective superposition of corresponding function and reference pulses across said electrode means at individual marker electrodes, said last-defined means including common-connection means to each of said amplifiers, and separate individual connection means to each of said amplifiers, one of said connection means being directly connected for response to one of said pulses, and the other said connection means including delay means connected between successive amplifiers and responsive to the other of said pulses.

7. In a coincidence-recording means for the automatic selective recording of time coincidences of two concurrent pulse-characterized functions, discharge-circuit means including amplifier means and a plurality of spaced discharge electrodes adapted for producing marking discharges on a strip of electrically sensitive recording paper or the like, a control connection to said amplifier means and connected for response to one of said pulse-characterized functions, and delay line means including individual control connections in individually coupled relation with a plurality of said electrodes and responsive to the other of said pulse-characterized functions.

8. Recording means according to claim 7, in which said amplifier means includes a blocking oscillator.

9. Recording means according to claim 7, in which said amplifier means includes a thyratron.

10. In a recording system of the character indicated, pulse-time modulating means including a plurality of input means for accepting a corresponding plurality of signal functions to be continuously pulse-time modulated, said modulating means including output means for delivering a reference-pulse characteristic and a time-modulated function-pulse characteristic reflecting the instantaneous magnitudes of said signal functions, means for supporting and for continuously feeding electrically sensitive recording paper or the like, recording-head means generally transverse to movement of the paper or the like and including delay-line means responsive to said function-pulse characteristic, said delay-line means including means for sensing said function characteristic as a function of distance along said delay-line means, and means coordinating an operation of said sensing means with the cycle of said reference-pulse characteristic, whereby said sensing means may periodically examine variously delayed and therefore distance-displaced fluctuations in a characteristic representing said plurality of functions on said delay-line means.

11. In a recording system of the character indicated, pulse-timed-modulating means including a plurality of input means for accepting a corresponding plurality of signal functions to be continuously pulse-time modulated, and output means characterized by time-modulated function pulses, means for supporting and for continuously feeding electrically sensitive recording paper or the like, recording-head means generally transverse to movement of the paper or the like and including delay-line means, reference-pulse generator means synchronized with said time-modulating means and connected to said delay-line means, whereby reference pulses may be caused to travel along said delay-line means, and means for simultaneously sensing the entire delay-line means at times determined by said function-pulses, whereby for each function-pulse cycle said sensing means may examine the instantaneous position of a reference pulse on said delay-line means in accordance with the time-spacial relation of the function-pulses representing a plurality of input-signal functions.

12. In a recording system of the character indicated, pulse-time modulating means, including a plurality of input means for accepting a corresponding plurality of input signal functions to be continuously pulse-time modulated and output means characterized by time-modulated function-pulses, spaced elongated electrode means for transverse alignment with the movement of electrically sensitive recording paper or the like between said electrode means, one of said electrode means including delay-line means, and a reference-pulse generator synchronized with the cycle of said time-modulating means, one of said electrode means being connected for response to the output of said reference-pulse generator and the other said electrode means being connected for response to the output of said time-modulating means.

13. In a recording system of the character indicated, a plurality of independent time modulators, reference-pulse generator means for synchronizing said time-modulators, mixing means for multiplexing the outputs of said time-modulators, and recording means including delay-line means and spaced electrode means for accommodating moving electrically sensitive paper or the like between said electrode means, the output of said reference-pulse generator being connected to one of said electrode means, and the output of said mixing means being connected to the other of said electrode means.

14. A recording system according to claim 13, in which the output of said reference-pulse generator is connected to one end of said delay-line means.

15. In a recording system of the character indicated, a plurality of time-modulators, reference-pulse generator means for synchronizing the cycles of said time-modulators, whereby with respect to a reference-pulse characteristic, a function-pulse characteristic may be characterized by a plurality of function pulses reflecting various inputs to said time-modulators, means for multiplexing the outputs of said modulators, discharge-circuit means including a plurality of marking electrodes for application to one side of a piece of electrically sensitive recording paper or the like, electrical delay-line means for the delayed progressive application of one of said characteristics to said electrodes, and means including amplifier means responsive to the other of said characteristics and connected to said discharge-circuit means for increasing the charge potential across the paper in a sequence reflecting said other characteristic.

16. A device according to claim 15, in which said multiplexing means includes a separate amplifier for each time-modulator output, said amplifiers including a common output impedance.

17. A device according to claim 15, in which said multiplexing means includes a separate space-discharge device for each time-modulator output, and in which said output impedance is common to the cathode circuits of said space-discharge devices.

18. A system according to claim 15, in which said reference-pulse generator means includes manual means for controlling the cycling period thereof, whereby marking density may be selectively controlled.

19. In a recording system of the character indicated, a plurality of time-modulators, reference-pulse means for synchronizing the cycles of said time-modulators, whereby a plurality of function pulses reflecting various inputs to said time-modulators may be provided for each reference-pulse cycle, means for multiplexing the outputs of said modulators, discharge-circuit means including a plurality of marking electrodes for application to one side of a moving piece of electrically sensitive recording paper or the like, means for the delayed progressive application of a reference pulse to said electrodes, and means including amplifier means responsive to the output of said multiplexing means and connected to said discharge-circuit means for increasing the discharge potential across the paper in a time-modulated sequence reflecting the output of said multiplexing means.

20. In a recording system of the character indicated, a plurality of time-modulators, reference-pulse means for synchronizing the cycles of said time-modulators, whereby a plurality of function pulses reflecting various inputs to said time-modulators may be provided for each reference-pulse cycle, means for multiplexing the outputs of said modulators, discharge-circuit means including a plurality of marking electrodes for application to one side of a moving piece of electrically sensitive recording paper or the like, electrical delay-line means for the delayed progressive application of function pulses to said electrodes, and means including amplifier means responsive to the output of said multiplexing means and connected to said discharge-circuit means for increasing the discharge potential across the paper in response to said reference pulses.

21. In a recording device of the character indicated, recording-head means including two cooperating recording-head members with electrical connections thereto and having oppositely disposed generally longitudinally extending mutually facing discharge portions spaced sufficiently to accommodate therebetween an electrically-responsive recording paper or the like, one of said recording-head members including delay-line means with spaced electrically delayed connections thereto; feeding means for continuously feeding the recording paper or the like generally transversely of said recording-head means; pulse-generator means including time-modulating and reference-pulse means for energizing said recording-head means, said time-modulating means being responsive to an input variable and developing with respect to the reference characteristic of said reference-pulse means a time-modulated electrical signal having a function characteristic time-spaced with respect to said reference characteristic, the time-spacing between corresponding of said reference and function characteristics reflecting the instantaneous magnitude of input to said generator means; connection means connecting said generator means to one of said delay-line connections for applying one of said characteristics at said one connection and including a connection effectively applying the other said characteristics to one of the other of said connections, whereby corresponding of said characteristics will travel longitudinally of said recording device and relatively to each other, so that there may be a point of coincidence of said characteristics longitudinally of said recording paper or the like, each such point reflecting longitudinally of said paper or the like the instantaneous magnitude of input to said generator means; and power-operated marker means connected to said recording-head means and including means for connection to an additional source of power and responsive to such coincidence for establishing a sufficient incremental charge potential between said discharge portions to produce an electrical discharge therebetween of a magnitude to which the electrically-responsive paper or the like may respond.

22. In a recording device of the character indicated, a plurality of marker circuits each including blocking-oscillator means, each blocking-oscillator means including trigger means series-connected to a blocking oscillator, such series connection including a variable capacitance, and means ganging said variable capacitances, whereby the marking duty cycle of said oscillators may be selectively varied.

23. In a recording device of the character indicated, a plurality of marker circuits each including blocking-oscillator means, each blocking-oscillator means including trigger means series-parallel connected to a blocking oscillator, commutator means separately tapped to individual of said trigger means and responsive to a pulse characteristic, and means for applying a further pulse characteristic to said trigger means, said trigger means being biased against operation in response to one of said characteristics alone but for operation only upon coincidence of said characteristics at a particular one of said trigger means.

24. A recording system according to claim 10, in which said delay-line means includes two adjacent delay elements, and amplifier means connecting said elements to each other.

25. In a recording device of the character indicated, a marker circuit including blocking-oscillator means, said blocking-oscillator means including a trigger circuit therefor, pulse-generator means including means for determining a pulse-repetition period, and means for feeding pulses from said generator to said trigger circuit, said blocking-oscillator means having a recovery period characterized by the time between initiation of the principal surge of said oscillator means and until restoration to the excitation threshold thereof, said means for determining the pulse-repetition period including means determining said period as an interval less than said recovery period.

26. In a device of the character indicated, recording-head means including oppositely spaced elongated electrode means to accommodate a moving piece of electrically responsive recording paper or the like in the space between the said electrode means, one of said electrode means including a plurality of closely spaced generally aligned electrode portions, multi-tap delay-line means, pulse-generator means including time-modulator and reference-pulse means for energizing said recording-head means, said time-modulator and reference-pulse means being responsive to an input variable for producing reference and function pulses time-spaced in accordance with the instantaneous magnitude of said variable, said pulses being of an effective time duration substantially equal to the delay time between adjacent taps of said delay-line means, means connecting one end of said delay-line means for response to one of said pulses, marking-control means connected to said electrode portions and to a plurality of the taps of said delay-line means, and a control connection to said marking-control means for response to the other of said pulses.

27. A device according to claim 6, in which the duration of one of said pulses is substantially equal to the travel time along said delay means between the connections to two successive amplifiers.

References Cited in the file of this patent

UNITED STATES PATENTS

| | | |
|---|---|---|
| 2,190,753 | Browne et al. | Feb. 20, 1940 |
| 2,266,154 | Blumlein | Dec. 16, 1941 |
| 2,477,062 | Jacobi | July 26, 1949 |
| 2,501,791 | Silverman | Mar. 28, 1950 |
| 2,587,319 | Hogan | Feb. 26, 1952 |